Patented Nov. 14, 1933

1,935,207

UNITED STATES PATENT OFFICE 1,935,207

PROCESS FOR THE PURIFICATION OF A CRUDE HYDROCARBON

Max Harder and Wilhelm Dietrich, Oppau, Germany, assignors to I. G. Farbenindustrie Aktiengesellschaft, Frankfort-on-the-Main, Germany No Drawing. Application February 12, 1931, Serial No. 515,401, and in Germany March 27, 1930

5 Claims. (Cl. 196—40)

This invention relates to the purification of crude hydrocarbons.

It has already been proposed to purify crude hydrocarbons by subjecting them to a treatment with concentrated sulphuric acid.

We have now found that the purifying action of sulphuric acid is improved to a very great extent by causing it to act in the presence of oxides of nitrogen. The oxides of nitrogen or nitrose or nitrosyl sulphuric acid or nitric acid and the like may be employed. Oxides of nitrogen may be added to the concentrated or fuming sulphuric acid serving for the purification, a certain amount of oxides of nitrogen may be dissolved in the hydrocarbons to be treated or they may be mixed and the mixture further treated with sulphuric acid. The separated impurities are removed, if desired together with the unconsumed acid.

The temperature during the treatment and the concentration of the oxides of nitrogen are chosen so low that practically no charring or other change or decomposition of the hydrocarbons to be treated takes place, only the impurities, which mainly consist of organic nitrogen, sulphur and oxygen compounds, being separated. The temperature should usually not considerably exceed 30° C. at least at the beginning of the treatment. However, where oils rich in paraffin wax are treated temperatures of up to 80° C. may be employed. In most cases a few per cent (calculated with reference to the initial materials to be treated) of oxides of nitrogen, for example between 0.3 and 5 per cent are sufficient. If the oxides of nitrogen are present in the sulphuric acid employed the concentration thereof in the acid should be between 5 and 30 per cent. The treatment can frequently be completed in about half an hour.

The resulting products are eminently suitable for further conversions, as for example catalytic conversions such as oxidation and hydrogenation. The process has the advantage that a "doctor" treatment with plumbite solutions is usually rendered superfluous.

The following examples will further illustrate the nature of this invention, but the invention is not restricted to these examples. The parts are by weight.

Example 1

30 parts of a chamber sulphuric acid containing 20 per cent of nitrosyl sulphuric acid are gradually added while stirring at 30° C. to 500 parts of Russian gas oil. After removing the acid sludge, the product is washed with an alkali. If necessary, the washing with alkali may be preceded by washing with concentrated sulphuric acid.

Example 2

5 parts of oxides of nitrogen are led at 5° C. into 500 parts of American gas oil in the presence of 25 parts of concentrated sulphuric acid. The further treatment is carried out in the manner described in Example 1.

Example 3

A mixture of 50 parts of concentrated sulphuric acid and 5 parts of concentrated nitric acid is stirred into 1000 parts of molten crude paraffin wax containing from 95 to 98 per cent of wax at a temperature of about 80° C. during a period of 15 minutes. The further treatment is carried out in the same manner as described in Example 1.

Example 4

100 parts of a fraction of paraffin oil containing 30 per cent of paraffin wax are vigorously stirred with 1390 parts of a mixture comprising 1300 parts of concentrated sulphuric acid and 90 parts of concentrated nitric acid for about 15 minutes at a temperature of about 80° C. After removal of the acid sludge, 2 per cent of bleaching earth are added to clarify the mixture, and the product is then washed with water. It forms an admirable initial material for oxidation with air to oxygen-containing organic compounds.

What we claim is:—

1. A process for the purification of a crude hydrocarbon, which comprises treating said hydrocarbon simultaneously with sulphuric acid and between 0.3 and 5 per cent of an oxide of nitrogen, reckoned with reference to the initial material to be treated at a temperature not exceeding 30° C.

2. A process for the purification of a crude hydrocarbon, which comprises treating said crude hydrocarbon with sulphuric acid containing between 5 and 30 per cent of oxides of nitrogen at a temperature not exceeding 30° C.

3. A process for the purification of a crude hydrocarbon, which comprises treating said hydrocarbon simultaneously with sulphuric acid and between 0.3 and 5 per cent of an oxide of nitrogen, reckoned with reference to the initial material to be treated, at a temperature not exceeding 30° C. for a period not exceeding 30 minutes.

4. A process for the purification of a crude hydrocarbon, which comprises stirring gas oil with chamber sulphuric acid containing about 20 per cent of nitrosyl sulphuric acid and maintaining a temperature of about 30° C.

5. A process for the purification of a crude hydrocarbon which comprises leading about 5 parts of oxides of nitrogen at about 5° C. into about 500 parts of gas oil in the presence of about 25 parts of concentrated sulfuric acid.

MAX HARDER.
WILHELM DIETRICH.